US012248399B2

(12) United States Patent
Yeung et al.

(10) Patent No.: US 12,248,399 B2
(45) Date of Patent: Mar. 11, 2025

(54) MULTI-BLOCK CACHE FETCH TECHNIQUES

(71) Applicant: Apple Inc., Cupertino, CA (US)

(72) Inventors: Winnie W. Yeung, San Jose, CA (US); Cheng Li, Sunnyvale, CA (US)

(73) Assignee: Apple Inc., Cupertino, CA (US)

(*) Notice: Subject to any disclaimer, the term of this patent is extended or adjusted under 35 U.S.C. 154(b) by 8 days.

(21) Appl. No.: 17/324,800

(22) Filed: May 19, 2021

(65) Prior Publication Data

US 2022/0374359 A1 Nov. 24, 2022

(51) Int. Cl.
| | |
|---|---|
| *G06F 12/0811* | (2016.01) |
| *G06F 12/02* | (2006.01) |
| *G06F 12/0846* | (2016.01) |
| *G06F 12/0891* | (2016.01) |
| *G06F 13/16* | (2006.01) |

(52) U.S. Cl.
CPC ...... *G06F 12/0811* (2013.01); *G06F 12/0246* (2013.01); *G06F 12/0846* (2013.01); *G06F 12/0891* (2013.01); *G06F 13/1605* (2013.01); *G06F 13/1668* (2013.01)

(58) Field of Classification Search
CPC ............ G06F 12/0811; G06F 12/0246; G06F 12/0846; G06F 12/0891; G06F 13/1605; G06F 13/1668
USPC ........................................................ 711/118
See application file for complete search history.

(56) References Cited

U.S. PATENT DOCUMENTS

| | | | |
|---|---|---|---|
| 6,256,727 B1 | 7/2001 | McDonald | |
| 7,783,840 B2 | 8/2010 | Hataida et al. | |
| 9,892,803 B2 | 2/2018 | Reed | |
| 10,579,531 B2 | 3/2020 | Lee et al. | |
| 10,621,100 B1* | 4/2020 | Meier | G06F 12/0862 |
| 2003/0088758 A1* | 5/2003 | Becker | G06F 9/3842 |
| | | | 712/E9.055 |
| 2004/0148471 A1* | 7/2004 | Wallin | G06F 12/0862 |
| | | | 711/137 |
| 2007/0067567 A1* | 3/2007 | Jiao | G06F 12/0844 |
| | | | 711/E12.044 |
| 2009/0198858 A1* | 8/2009 | Ban | G11C 7/1009 |
| | | | 710/307 |
| 2009/0249036 A1* | 10/2009 | Rappoport | G06F 9/3017 |
| | | | 712/E9.016 |
| 2015/0121009 A1* | 4/2015 | Smith | G06F 12/1009 |
| | | | 711/122 |

(Continued)

*Primary Examiner* — Gautam Sain
*Assistant Examiner* — Wei Ma
(74) *Attorney, Agent, or Firm* — Kowert, Hood, Munyon, Rankin & Goetzel, P.C.; Michael B. Davis; Dean M. Munyon

(57) ABSTRACT

Techniques are disclosed relating to multi-block fetches for cache misses. In some embodiments, cache tag circuitry maintains a tag value that is shared by multiple cache blocks. In response to a miss, the cache may initiate a fetch request to a next level cache or memory. Aggregation circuitry may aggregate multiple fetch requests for cache blocks that share the tag value and fetch circuitry may initiate a single multi-block fetch operation to the next level cache or memory that returns cache blocks for the aggregated multiple fetch requests. In various embodiments, disclosed techniques may improve performance (e.g., by reducing fetch bus transactions), reduce power consumption, or both, relative to traditional techniques.

20 Claims, 8 Drawing Sheets

(56) References Cited

U.S. PATENT DOCUMENTS

2018/0307608 A1* 10/2018 Di .................. G06F 9/3802
2019/0042422 A1*  2/2019 Wang ............... G06F 12/0897
2019/0079874 A1*  3/2019 García Guirado .. G06F 12/0895
2019/0213707 A1*  7/2019 Cooray ............. G06F 12/1009

* cited by examiner

MULTI-BLOCK CACHE FETCH TECHNIQUES

BACKGROUND

Technical Field

This disclosure relates generally to computer caches and more particularly to multi-block fetch requests for cache misses.

Description of the Related Art

Caching is a well-known computing technique in which a subset of data is stored in (typically) faster cache circuitry and may be accessed multiple times without accessing a higher-level cache or memory. Memory read requests typically include an address and a portion of the address is used as a "tag" to determine whether data is already present in the cache. If not, a cache miss occurs and the requested data is fetched (and typically stored in the cache for potential subsequent requests).

Caching may be implemented for various types of information, e.g., instructions and data. Similarly, caching may be utilized for translation data, e.g., in a translation lookaside buffer (TLB) that translates virtual addresses to physical addresses. More generally, caching may be utilized for translation information from one address space to another. In caches for translation, cache blocks may store page table entries.

DETAILED DESCRIPTION

In disclosed embodiments, cache control circuitry is configured to share a tag across multiple cache blocks and aggregate multiple fetch requests that share the tag, e.g., until one of the requests wins arbitration. At that point, the control circuitry issues a multi-block fetch request. Disclosed techniques may advantageously reduce transactions on a fetch bus an efficiently use its bandwidth, particular in embodiments with a fetch bus that is wider than the cache block size. Disclosed techniques may also reduce power consumption by less frequently updating the tag. Further, disclosed techniques may reduce tag area due to shared tag addresses.

Figure 1A:
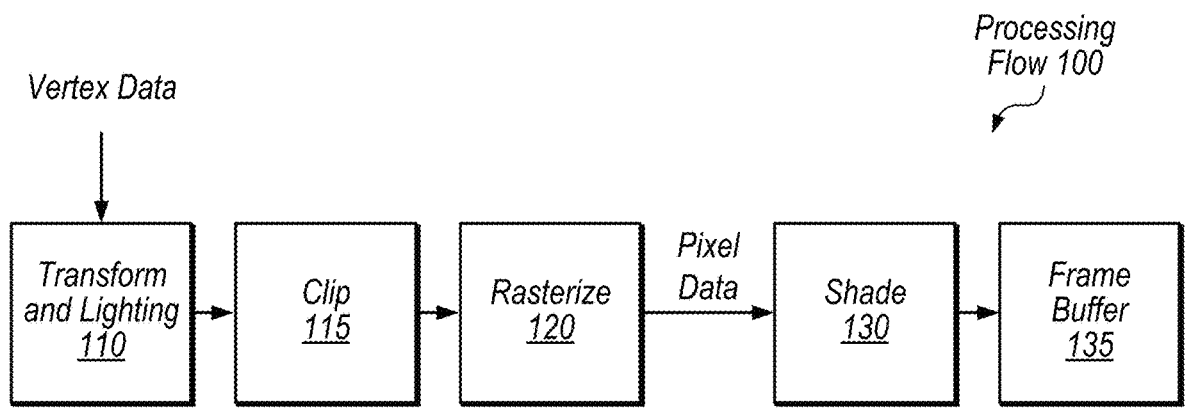
FIG. 1A is a diagram illustrating an overview of example graphics processing operations, according to some embodiments.
Figure 1B:
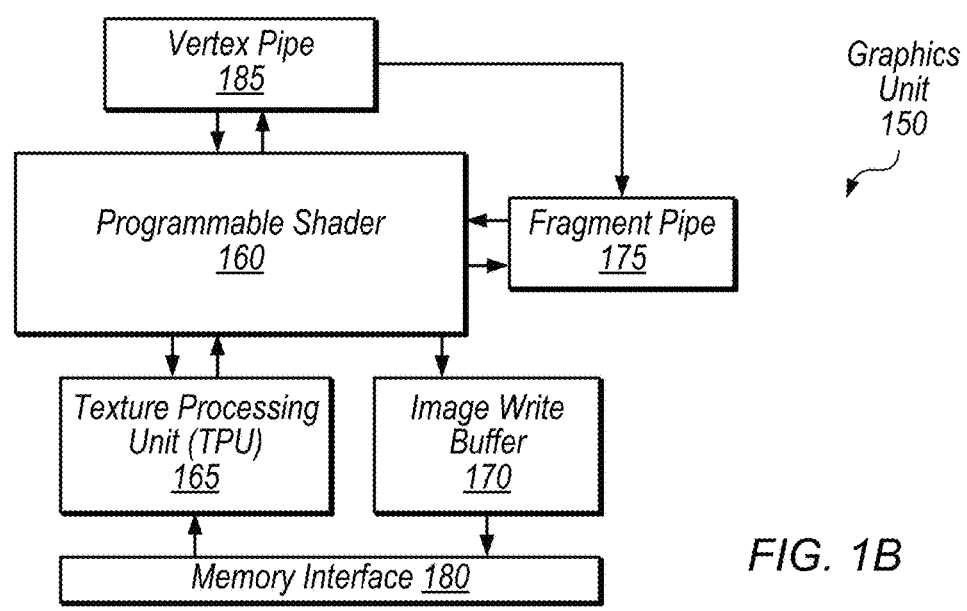
FIG. 1B is a block diagram illustrating an example graphics unit, according to some embodiments.
Figure 2:
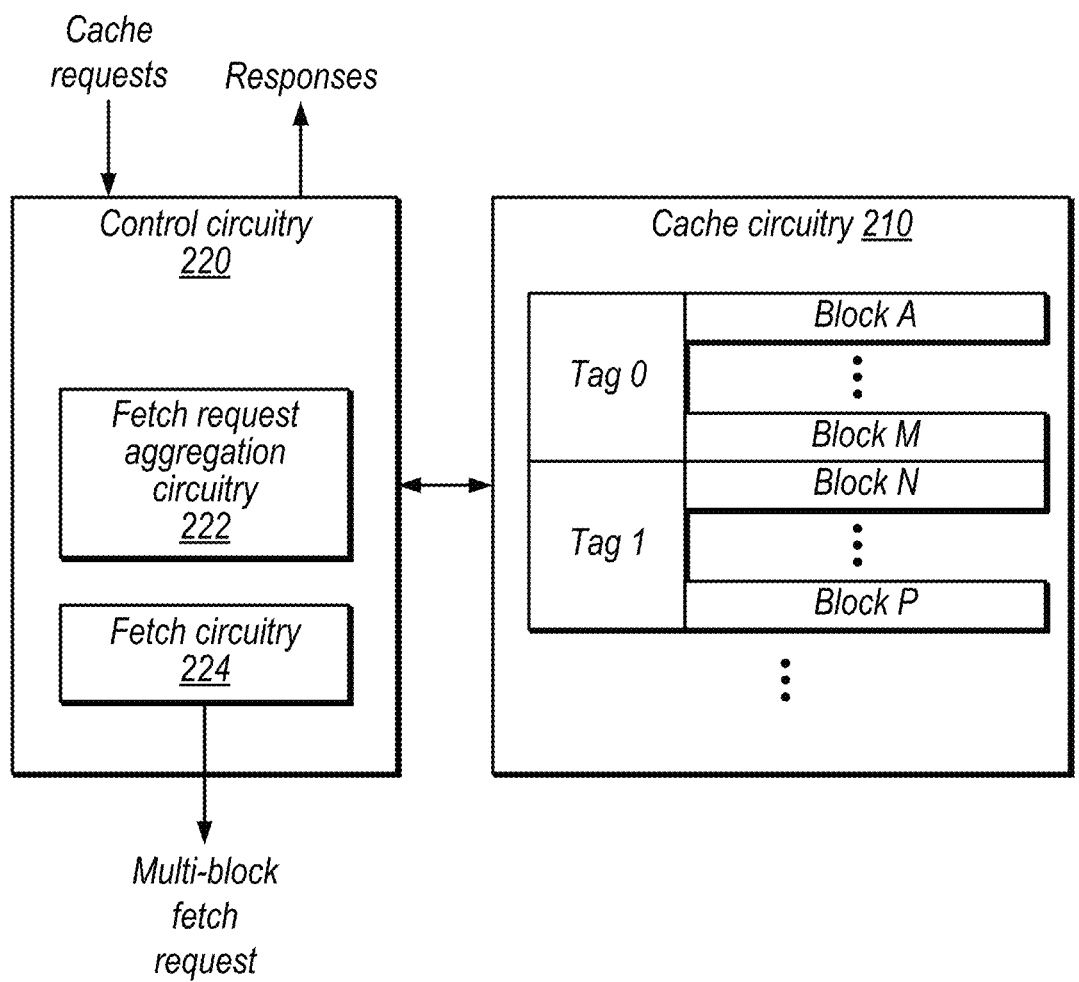
FIG. 2 is a block diagram illustrating example cache circuitry with a shared tag for multiple blocks, according to some embodiments.
Figure 3:
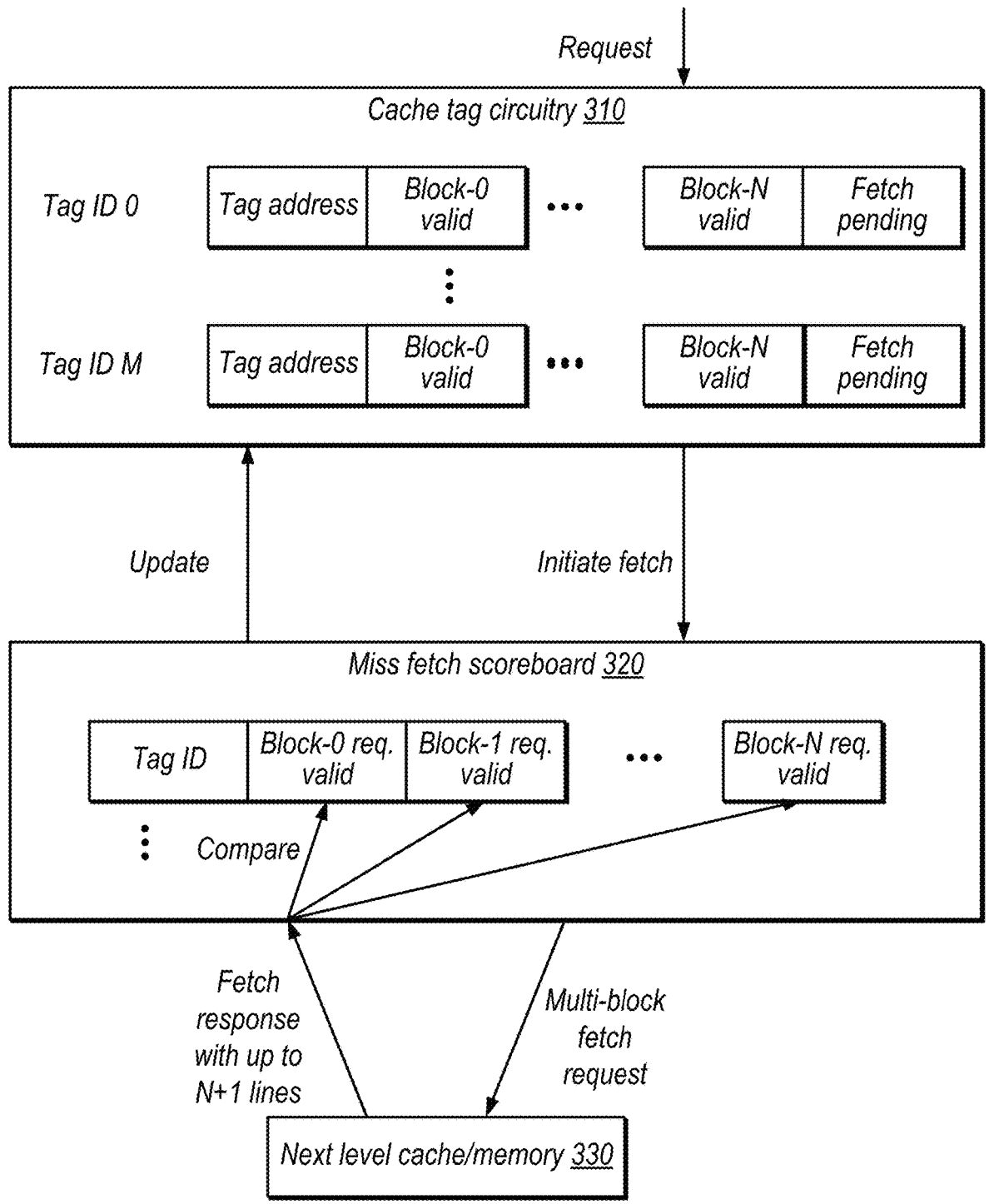
FIG. 3 is a block diagram illustrating an example miss fetch scoreboard for multi-block fetch requests, according to some embodiments.
Figure 4:
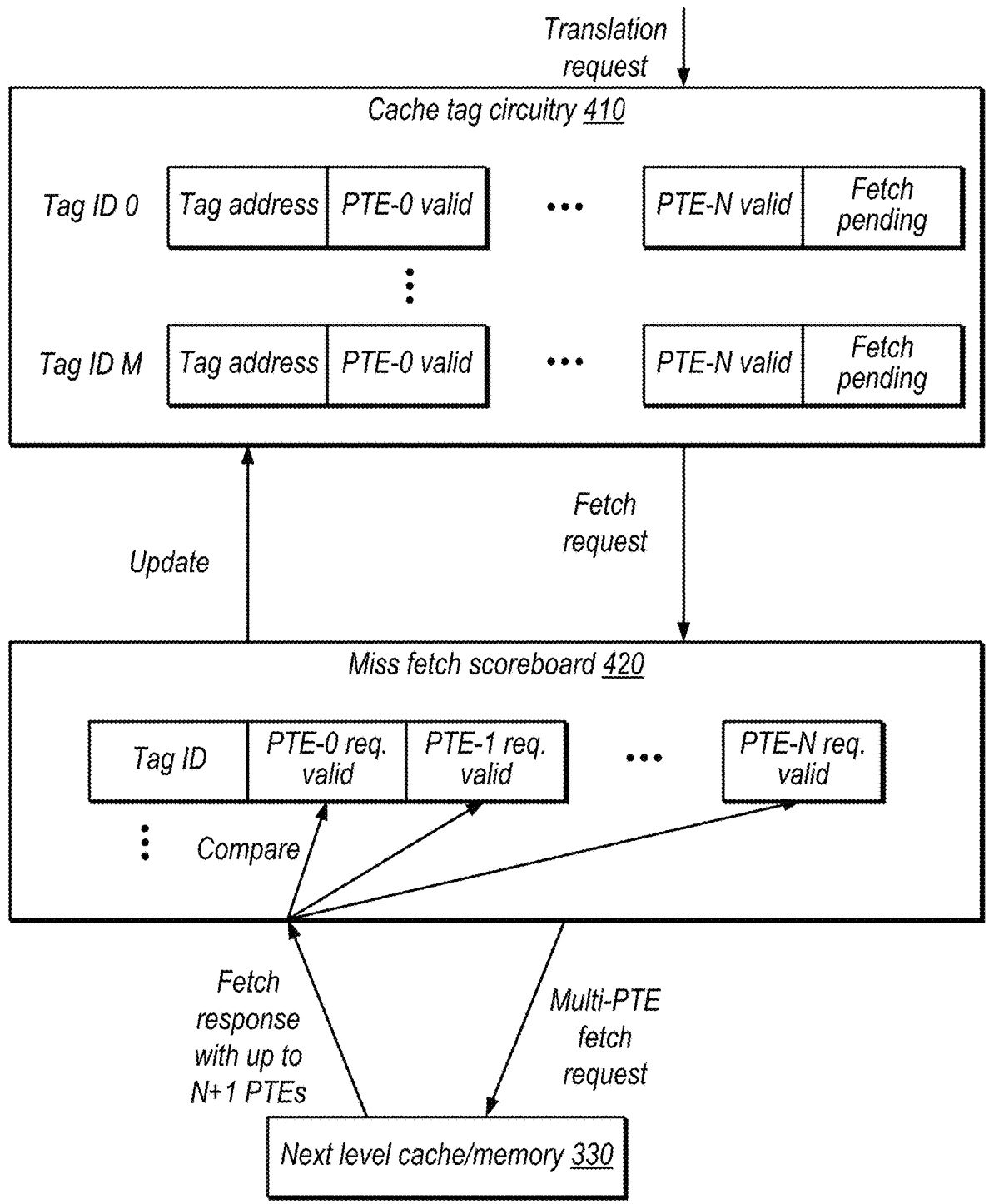
FIG. 4 is a block diagram illustrating an example miss fetch scoreboard for caching in the context of address translations, according to some embodiments.

FIGS. 1A-1B provide an overview of graphics processing, which may implement disclosed caching techniques (although these techniques may also be implemented in other contexts such as central processing units, memory controllers, etc.). FIG. 2 provides an overview of cache control circuitry configured to issue multi-block fetch requests. FIGS. 3 and 4 provide example scoreboard circuitry configured to aggregate fetch requests. The remaining figures provide example methods, devices, systems, and computer-readable media.

Graphics Processing Overview

Referring to FIG. 1A, a flow diagram illustrating an example processing flow 100 for processing graphics data is shown. In some embodiments, transform and lighting procedure 110 may involve processing lighting information for vertices received from an application based on defined light source locations, reflectance, etc., assembling the vertices into polygons (e.g., triangles), and transforming the polygons to the correct size and orientation based on position in a three-dimensional space. Clip procedure 115 may involve discarding polygons or vertices that fall outside of a viewable area. Rasterize procedure 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer), ignoring one or more fragments (e.g., if they are covered by other objects), or both. Shade procedure 130 may involve altering pixel components based on lighting, shadows, bump mapping, translucency, etc. Shaded pixels may be assembled in a frame buffer 135. Modern GPUs typically include programmable shaders that allow customization of shading and other processing procedures by application developers. Thus, in various embodiments, the example elements of FIG. 1A may be performed in various orders, performed in parallel, or omitted. Additional processing procedures may also be implemented.

Referring now to FIG. 1B, a simplified block diagram illustrating a graphics unit 150 is shown, according to some embodiments. In the illustrated embodiment, graphics unit 150 includes programmable shader 160, vertex pipe 185, fragment pipe 175, texture processing unit (TPU) 165, image write unit 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 or programmable shader 160 to generate fragment data. Vertex pipe 185 and fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and TPU 165. Programmable shader 160 may be configured to perform vertex processing tasks on vertex data which may include various transformations and adjustments of vertex data. Programmable shader 160, in the illustrated embodiment, is also configured to perform fragment processing tasks on pixel data such as texturing and shading, for example. Programmable shader 160 may include multiple sets of multiple execution pipelines for processing data in parallel.

In some embodiments, programmable shader includes pipelines configured to execute one or more different SIMD groups in parallel. Each pipeline may include various stages configured to perform operations in a given clock cycle, such as fetch, decode, issue, execute, etc. The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

The term "SIMD group" is intended to be interpreted according to its well-understood meaning, which includes a set of threads for which processing hardware processes the same instruction in parallel using different input data for the different threads. Various types of computer processors may include sets of pipelines configured to execute SIMD instructions. For example, graphics processors often include programmable shader cores that are configured to execute instructions for a set of related threads in a SIMD fashion. Other examples of names that may be used for a SIMD group include: a wavefront, a clique, or a warp. A SIMD group may be a part of a larger thread group, which may be broken up into a number of SIMD groups based on the parallel processing capabilities of a computer. In some embodiments, each thread is assigned to a hardware pipeline that fetches operands for that thread and performs the specified operations in parallel with other pipelines for the set of threads. Note that processors may have a large number of pipelines such that multiple separate SIMD groups may also execute in parallel. In some embodiments, each thread has private operand storage, e.g., in a register file. Thus, a read of a particular register from the register file may provide the version of the register for each thread in a SIMD group.

In some embodiments, multiple programmable shader units 160 are included in a GPU. In these embodiments, global control circuitry may assign work to the different sub-portions of the GPU which may in turn assign work to shader cores to be processed by shader pipelines.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write unit (IWU) 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

Overview of Multi-Cache-Block Fetch Requests

FIG. 2 is a block diagram illustrating example control circuitry configured to issue multi-line fetch requests, according to some embodiments. In the illustrated embodiment, a computing device includes control circuitry 220 and cache circuitry 210.

Cache circuitry 210, in the illustrated embodiment, includes circuitry configured to store multiple cache blocks. In the illustrated embodiment, each cache tag is shared by multiple cache blocks. In some embodiments, cache circuity 210 maintains a validity field per cache block (not shown in FIG. 2) and the cache circuitry is configured to use the tag circuitry and validity fields to determine hits and misses at cache block granularity. For example, if an incoming request matches a tag and the corresponding block is valid, control circuitry 220 may determine a cache hit (and may determine a miss otherwise).

In some embodiments, cache circuitry 210 is configured to cache translation information such as page table entries for address translation. In other embodiments, cache circuitry 210 may cache other types of information, e.g., in data cache or instruction cache embodiments. In translation cache embodiments, cache circuitry 210 may typically be set associative or fully associative. In various embodiments, cache circuitry 210 may have various associativity configurations, including direct mapped implementations. Cache circuitry 210 may implement various appropriate numbers of sets, numbers of ways per set, block sizes, numbers of values per block, replacement/eviction schemes, etc. in different embodiments.

In some embodiments, cache circuitry 210 implements a read-only cache. For example, table walk circuitry may update cache 210 to cache translation data during table walks, but incoming requests are reads only and do not include writes, in some embodiments.

Control circuitry 220, in the illustrated embodiment, is configured to receive cache requests and provide responses. For misses, control circuitry 220 is configured to aggregate fetch requests and issue multi-block fetch requests in certain scenarios (control circuitry 220 may also issue single-block fetch requests, e.g., when only one block is needed or in certain operating modes). In the illustrated embodiment, control circuitry 220 includes fetch request aggregation circuitry 222 and fetch circuitry 224.

Fetch request aggregation circuitry 222, in the illustrated embodiment, is configured to aggregate pending fetch requests to the same cache block. These pending requests may be waiting to win arbitration to access a bus to transmit a fetch request, for example. Arbitration circuitry (not explicitly shown) may arbitrate among pending fetch requests to select requests to access a fetch bus, for example.

Fetch circuitry 224, in the illustrated embodiment, is configured to issue multi-block fetch requests. In some embodiments, the bus used to return fetch data may be sufficiently wide to return multiple cache blocks in parallel. As one non-limiting example, for 64 byte cache lines, the bus may be a 256 byte bus and tags may be shared by four cache blocks. When a multi-block fetch response is received, control circuitry 220 may update a fetch pending field for a shared tag. In some embodiments, the fetch request aggregation circuitry maintains a per-cache-block field that indicates whether a valid fetch request is outstanding for the block, which may also be updated based on a response to a multi-line fetch request. FIG. 3 provides detailed examples of such fields.

Example Scoreboard for Aggregating Requests

FIG. 3 is a block diagram illustrating example cache tag circuitry and a miss fetch scoreboard, according to some embodiments. Illustrated circuitry may be included in control circuitry 220, cache circuitry 210, or both.

Cache tag circuitry 310, in the illustrated embodiment, maintains information for each tag identifier for active tags in the cache. In the illustrated embodiment, for a given tag, circuitry 310 includes a field per cache block that shares the tag, where the field indicates whether that block is valid. In some embodiments, a number of adjacent cache blocks/lines may share the same tag. Circuitry 310 also includes a fetch pending field that indicates whether a fetch is pending for any of the blocks that share the tag.

For an incoming request that matches a tag and has a valid corresponding block, cache tag circuitry 310 may determine a cache hit and provide the cached block. For an incoming that does not match any tag, cache tag circuitry 310 may indicate a miss, initiate a fetch request, and may allocate a cache entry for the tag. For an incoming request that matches a tag but does not have a corresponding valid block, circuitry 310 may indicate a miss and initiate a fetch request. In various situations where cache tag circuitry 310 initiates a fetch, it may set the fetch pending field in circuitry 210 for the tag and set the corresponding block request valid field in miss fetch scoreboard 320. Control circuitry may clear the fetch pending field for a tag when all fetches for blocks that share the tag have completed.

Miss fetch scoreboard 320, in the illustrated embodiment, is configured to aggregate fetch requests for blocks that share the same tag identifier. For example, if blocks 1, 2, and 4 share a given tag and all initiate fetch requests before any of the other fetch requests initiate arbitration, control circuitry is configured to set the corresponding fields in miss fetch scoreboard 320. When the corresponding entry in miss fetch scoreboard entry 320 wins arbitration for a tag (or more generally, when requests for a tag are ready to proceed), it submits a multi-block fetch request to next level cache or memory 330 if multiple block request valid fields are set. The multi-block fetch request may include information that identifies the blocks to be fetched. This may include, for example, the tag and fields (e.g., bits) for each block associated with the tag indicating whether those fields are to be fetched. It may also include additional address information such as an index portion of the address, in some embodiments.

When the fetch response is received, it may include up to N+1 blocks (corresponding to the greatest number of blocks that are allowed to share the same tag). The response may encode which blocks were returned for the associated tag, e.g., using a bit per block potentially returned. Miss fetch scoreboard 320 is configured to compare the request valid bits for the blocks with the blocks included in the fetch response. If all blocks were successfully returned for blocks with valid requests, miss fetch scoreboard 320 may clear the fetch pending field in circuitry 310 and clear the corresponding block request valid fields. If not all blocks were returned (e.g., due to incoming additional fetch requests to the tag after the multi-block fetch request was transmitted), miss fetch scoreboard 320 may update only blocks with returned data and may initiate a re-fetch for remaining block(s).

In some embodiments, the number of entries in miss fetch scoreboard is smaller than the number of tag entries in cache tag circuitry 310. Miss fetch scoreboard 320 may allocate an entry and set a block request valid field in response to a fetch request for a tag that is not already present in the scoreboard. Similarly, for a fetch request whose tag is already in the scoreboard, miss fetch scoreboard 320 may set a corresponding block request valid field.

In various embodiments, disclosed techniques may advantageously reduce transactions on the fetch bus (which may more efficiently utilize fetch bus bandwidth) and may reduce power consumption by less frequently updating the tag fields, relative to traditional techniques. Further, disclosed techniques may reduce tag circuitry area, e.g., due to sharing tag address portions for comparison across multiple cache blocks.

Example Address Translation Implementation

FIG. 4 is a block diagram illustrating example miss fetch scoreboard circuitry in the translation lookaside buffer (TLB) context, according to some embodiments. In this example, the translation request includes an address in a first address space (e.g., a virtual address) and the fetch response includes information such as a page table entry (PTE) associated with translating the address to a second address space (e.g., a physical space).

The embodiment of FIG. 4 may operate similarly to the embodiment of FIG. 3. In the illustrated example, the cache blocks store PTEs and a PTE valid field is included for each cache block that shares a tag in cache tag circuitry 410. Similarly, miss fetch scoreboard circuitry 420 includes a PTE request valid field for each block that shares a tag.

Cache tag circuitry 410 may be a TLB cache or may be an internal table walk cache (e.g., that stores page table entries, page directory entries, page catalog entries, etc.). In embodiments with multiple levels of caching, different address portions may be used for tag, set select, and block offset. In some embodiments, disclosed multi-block fetch techniques may be used at multiple different cache levels.

Note that in some embodiments, multi-block fetch requests are not pre-fetches (e.g., fetches based on predictions that cache blocks will be needed in the future rather than based on actual requests). Therefore, in the embodiments of FIGS. 3 and 4, for example, rather than blindly fetching a set of contiguous blocks of data, scoreboard circuitry maintains a field per potential block indicating whether that block is requested, while non-requested blocks are not fetched. Disclosed techniques may be more efficient than pre-fetching in certain implementations, particularly where access to a block may not imply a greater likelihood of accessing the next adjacent block in the near future, e.g., in page table walk embodiments. In some embodiments, disclosed techniques may be used in conjunction with pre-fetching at a given cache level.

Example Method

Figure 5:
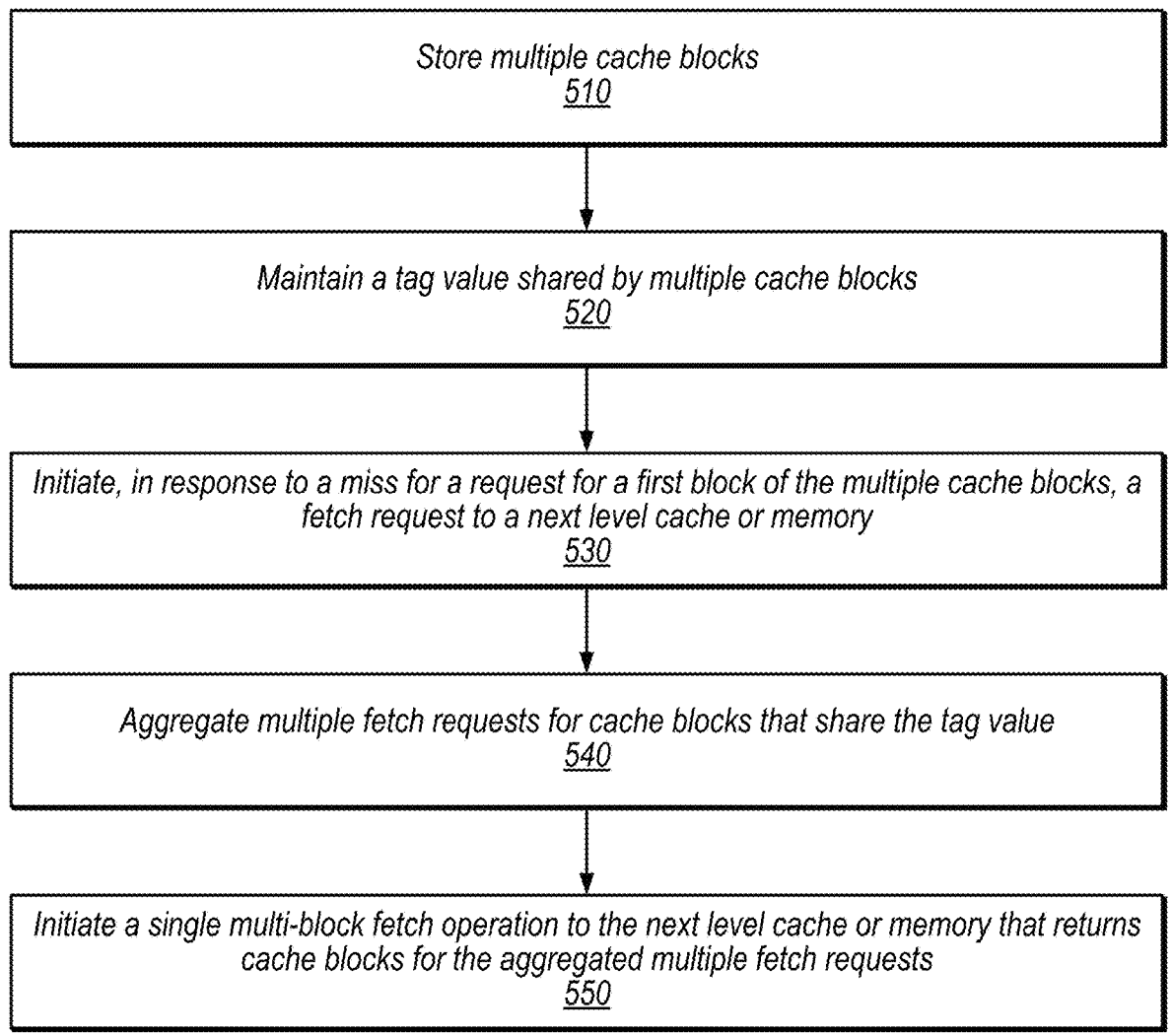
FIG. 5 is a flow diagram illustrating an example method, according to some embodiments.

FIG. 5 is a flow diagram illustrating an example method for generating a multi-block fetch request, according to some embodiments. The method shown in FIG. 5 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 510, in the illustrated embodiment, cache circuitry (e.g., cache circuitry 210) stores multiple cache blocks. In some embodiments, the cache blocks store respective page table entries and the cache circuitry is included in translation circuitry that is configured to convert an input address in a first address space to an output address in a second address space based on a page table entry (e.g., for a TLB that caches translation information for translations from virtual addresses to physical addresses). In some embodiments, the cache circuity maintains a validity field per cache block and is configured to use the tag circuitry and validity fields to determine hits and misses at cache block granularity. Said another way, cache control circuitry may determine hits and misses at a smaller granularity (e.g., block granularity) than the amount of data that may be fetched from a next-level cache or memory (e.g., multiple blocks).

At 520, in the illustrated embodiment, tag circuitry (e.g., cache tag circuitry 310) maintains a tag value shared by multiple cache blocks. In some embodiments, the cache circuitry maintains a fetch pending field for a set of cache blocks that share the tag value. The fetch pending field may indicate whether a fetch is pending for any of the blocks that share the tag value.

At 530, in the illustrated embodiment, cache control circuitry (e.g., control circuitry 220) initiates, in response to a miss for a request for a first block of the multiple cache blocks, a fetch request to a next level cache or memory. In some embodiments, the aggregation circuitry maintains, for the tag, a set of fields that indicate whether respective cache blocks that share the tag have a valid fetch request (e.g., the block request valid fields of FIG. 3).

At 540, in the illustrated embodiment, aggregation circuitry (e.g., miss fetch scoreboard 320 or fetch request aggregation circuitry 222) aggregates multiple fetch requests for cache blocks that share the tag value. In some embodiments, arbitration circuitry is configured to arbitrate among requests to use a fetch bus and the aggregation circuitry is configured to aggregate fetch requests for cache blocks that share the tag value until the a request with the tag value wins arbitration for the fetch bus. In some embodiments, the fetch bus has a width that is sufficient to fetch data in parallel for the multiple cache blocks that share the tag. In other embodiments, the fetch bus may return data for the multi-block fetch requests over multiple beats (although note that the number of beats may be smaller than the number of blocks fetched, in some embodiments).

At 550, in the illustrated embodiment, fetch circuitry (e.g., fetch circuitry 224) initiates a single multi-block fetch operation to the next level cache or memory that returns cache blocks for the aggregated multiple fetch requests. In some embodiments, the fetch circuitry is configured to receive a fetch response for the multi-block fetch operation and update the set of fields that indicate whether respective cache blocks that share the tag have a valid fetch request, based on cache blocks indicated as fetched in the fetch response. For example, the fetch circuitry may update miss fetch scoreboard 320.

Example Device

Figure 6:
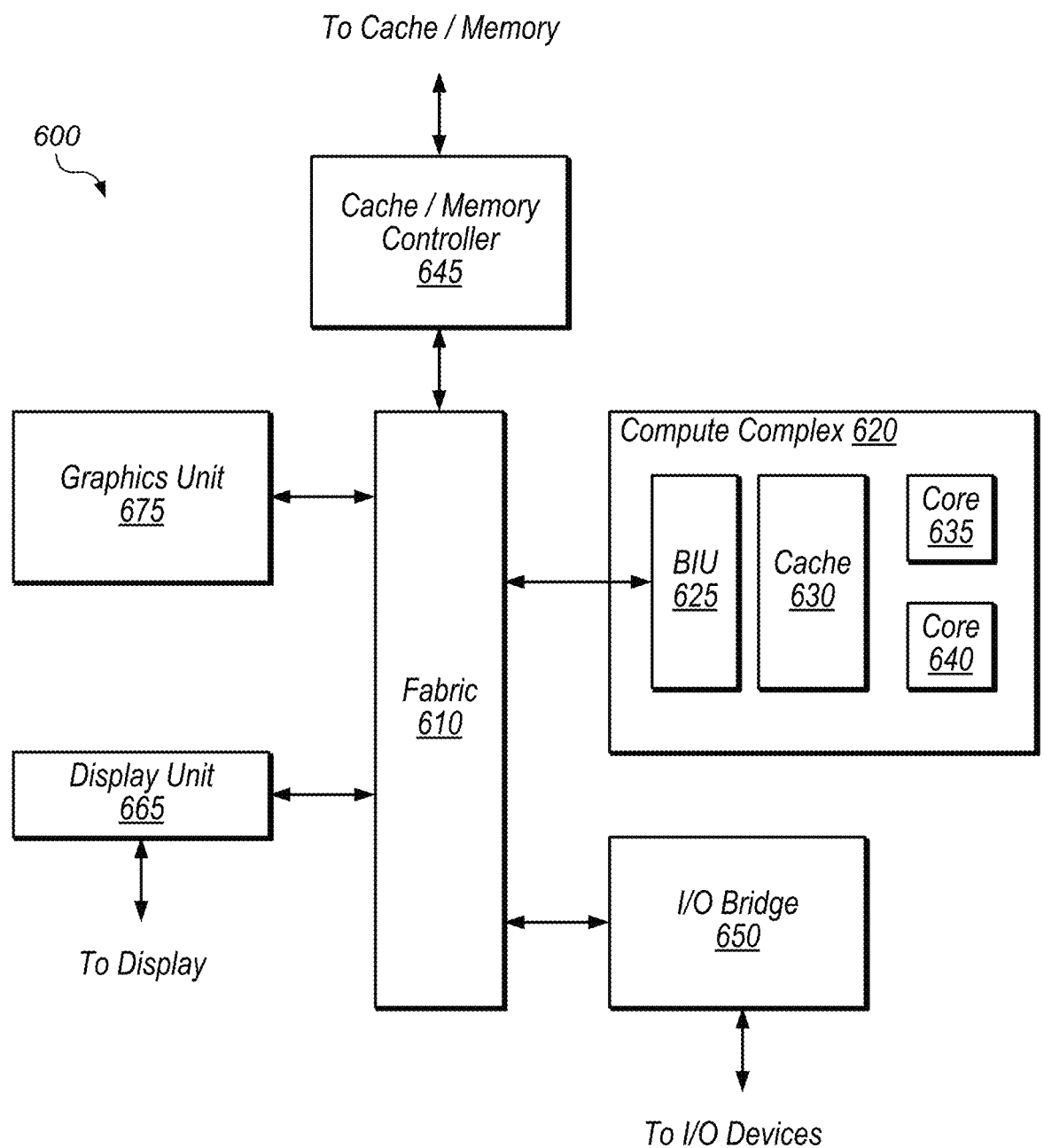
FIG. 6 is a block diagram illustrating an example computing device, according to some embodiments.

Referring now to FIG. 6, a block diagram illustrating an example embodiment of a device 600 is shown. In some embodiments, elements of device 600 may be included within a system on a chip. In some embodiments, device 600 may be included in a mobile device, which may be battery-powered. Therefore, power consumption by device 600 may be an important design consideration. In the illustrated embodiment, device 600 includes fabric 610, compute complex 620 input/output (I/O) bridge 650, cache/memory controller 645, graphics unit 675, and display unit 665. In some embodiments, device 600 may include other components (not shown) in addition to or in place of the illustrated components, such as video processor encoders and decoders, image processing or recognition elements, computer vision elements, etc.

Disclosed multi-block fetch techniques may be implemented in various elements of FIG. 6, including one or more of cores 635 and 640, graphics unit 675, and controller 645, for example.

Fabric 610 may include various interconnects, buses, MUX's, controllers, etc., and may be configured to facilitate communication between various elements of device 600. In some embodiments, portions of fabric 610 may be configured to implement various different communication protocols. In other embodiments, fabric 610 may implement a single communication protocol and elements coupled to fabric 610 may convert from the single communication protocol to other communication protocols internally.

In the illustrated embodiment, compute complex 620 includes bus interface unit (BIU) 625, cache 630, and cores 635 and 640. In various embodiments, compute complex 620 may include various numbers of processors, processor cores and caches. For example, compute complex 620 may include 1, 2, or 4 processor cores, or any other suitable number. In one embodiment, cache 630 is a set associative L2 cache. In some embodiments, cores 635 and 640 may include internal instruction and data caches. In some embodiments, a coherency unit (not shown) in fabric 610, cache 630, or elsewhere in device 600 may be configured to maintain coherency between various caches of device 600. BIU 625 may be configured to manage communication between compute complex 620 and other elements of device 600. Processor cores such as cores 635 and 640 may be configured to execute instructions of a particular instruction set architecture (ISA) which may include operating system instructions and user application instructions.

Cache/memory controller 645 may be configured to manage transfer of data between fabric 610 and one or more caches and memories. For example, cache/memory controller 645 may be coupled to an L3 cache, which may in turn be coupled to a system memory. In other embodiments, cache/memory controller 645 may be directly coupled to a memory. In some embodiments, cache/memory controller 645 may include one or more internal caches.

As used herein, the term "coupled to" may indicate one or more connections between elements, and a coupling may include intervening elements. For example, in FIG. 6, graphics unit 675 may be described as "coupled to" a memory through fabric 610 and cache/memory controller 645. In contrast, in the illustrated embodiment of FIG. 6, graphics unit 675 is "directly coupled" to fabric 610 because there are no intervening elements.

Graphics unit 675 may include one or more processors, e.g., one or more graphics processing units (GPU's). Graphics unit 675 may receive graphics-oriented instructions, such as OPENGL®, Metal, or DIRECT3D® instructions, for example. Graphics unit 675 may execute specialized GPU instructions or perform other operations based on the received graphics-oriented instructions. Graphics unit 675 may generally be configured to process large blocks of data in parallel and may build images in a frame buffer for output to a display, which may be included in the device or may be a separate device. Graphics unit 675 may include transform, lighting, triangle, and rendering engines in one or more graphics processing pipelines. Graphics unit 675 may output pixel information for display images. Graphics unit 675, in various embodiments, may include programmable shader circuitry which may include highly parallel execution cores configured to execute graphics programs, which may include pixel tasks, vertex tasks, and compute tasks (which may or may not be graphics-related).

Display unit 665 may be configured to read data from a frame buffer and provide a stream of pixel values for display. Display unit 665 may be configured as a display pipeline in some embodiments. Additionally, display unit 665 may be configured to blend multiple frames to produce an output frame. Further, display unit 665 may include one or more interfaces (e.g., MIPI® or embedded display port (eDP)) for coupling to a user display (e.g., a touchscreen or an external display).

I/O bridge 650 may include various elements configured to implement: universal serial bus (USB) communications, security, audio, and low-power always-on functionality, for example. I/O bridge 650 may also include interfaces such as pulse-width modulation (PWM), general-purpose input/output (GPIO), serial peripheral interface (SPI), and inter-integrated circuit (I2C), for example. Various types of peripherals and devices may be coupled to device 600 via I/O bridge 650.

In some embodiments, device 600 includes network interface circuitry (not explicitly shown), which may be connected to fabric 610 or I/O bridge 650. The network interface circuitry may be configured to communicate via various networks, which may be wired, wireless, or both. For example, the network interface circuitry may be configured to communicate via a wired local area network, a wireless local area network (e.g., via WiFi), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth or WiFi Direct), etc. In various embodiments, the network interface circuitry may provide device 600 with connectivity to various types of other devices and networks.

Example Applications

Figure 7:
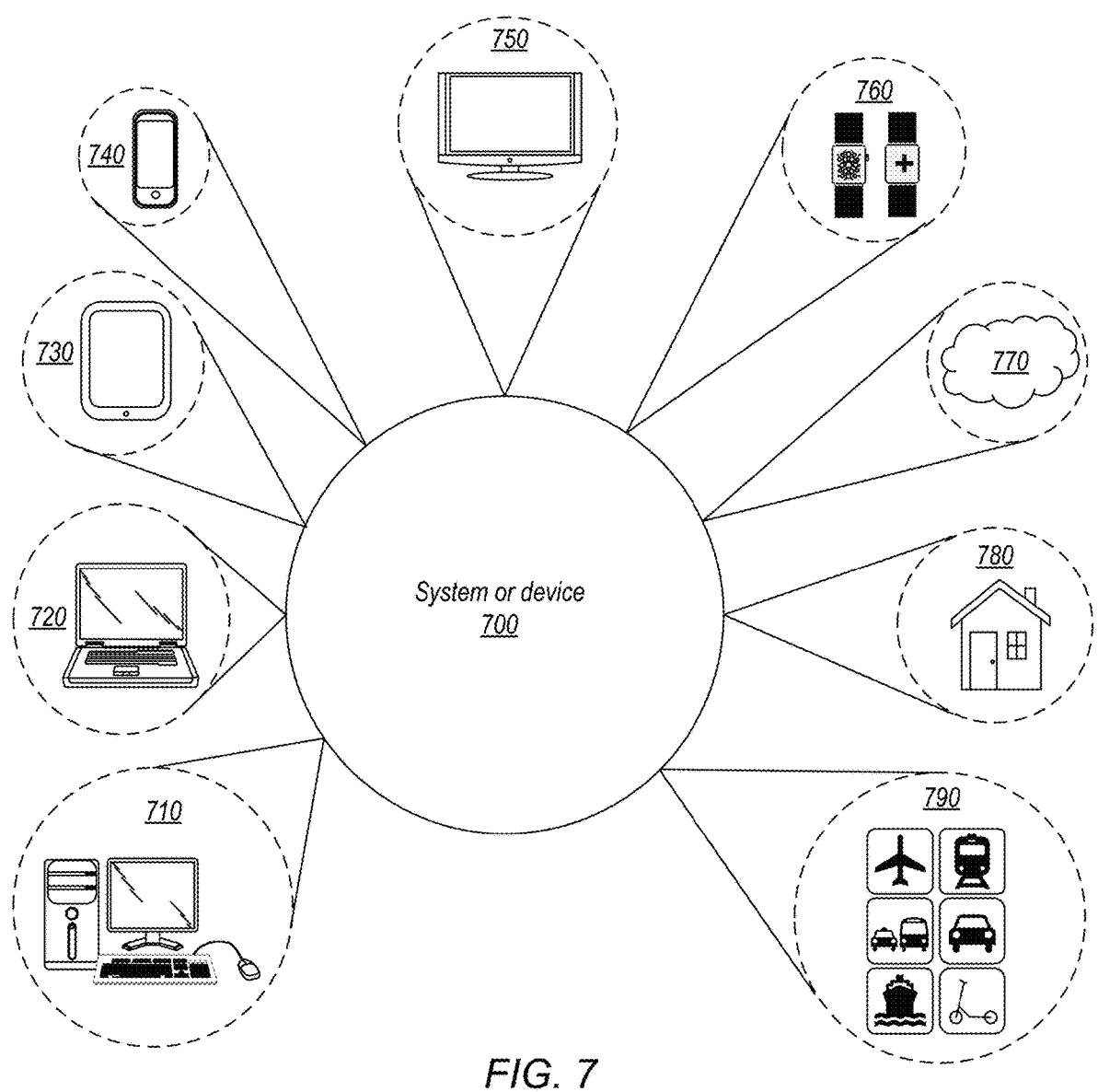
FIG. 7 is a diagram illustrating example applications of disclosed systems and devices, according to some embodiments.

Turning now to FIG. 7, various types of systems that may include any of the circuits, devices, or system discussed above. System or device 700, which may incorporate or otherwise utilize one or more of the techniques described herein, may be utilized in a wide range of areas. For example, system or device 700 may be utilized as part of the hardware of systems such as a desktop computer 710, laptop computer 720, tablet computer 730, cellular or mobile phone 740, or television 750 (or set-top box coupled to a television).

Similarly, disclosed elements may be utilized in a wearable device 760, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 700 may also be used in various other contexts. For example, system or device 700 may be utilized in the context of a server computer system, such as a dedicated server or on shared hardware that implements a cloud-based service 770. Still further, system or device 700 may be implemented in a wide range of specialized everyday devices, including devices 780 commonly found in the home such as refrigerators, thermostats, security cameras, etc. The interconnection of such devices is often referred to as the "Internet of Things" (IoT). Elements may also be implemented in various modes of transportation. For example, system or device 700 could be employed in the control systems, guidance systems, entertainment systems, etc. of various types of vehicles 790.

The applications illustrated in FIG. 7 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 8:
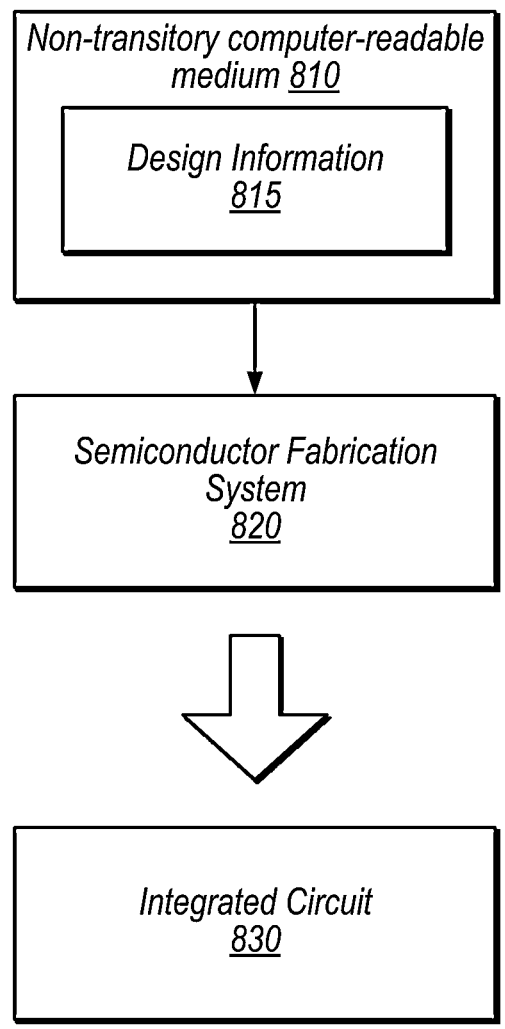
FIG. 8 is a block diagram illustrating an example computer-readable medium that stores circuit design information, according to some embodiments.

FIG. 8 is a block diagram illustrating an example non-transitory computer-readable storage medium that stores circuit design information, according to some embodiments. In the illustrated embodiment semiconductor fabrication system 820 is configured to process the design information 815 stored on non-transitory computer-readable medium 810 and fabricate integrated circuit 830 based on the design information 815.

Non-transitory computer-readable storage medium 810, may comprise any of various appropriate types of memory devices or storage devices. Non-transitory computer-readable storage medium 810 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 810 may include other types of non-transitory memory as well or combinations thereof. Non-transitory computer-readable storage medium 810 may include two or more memory mediums which may reside in different locations, e.g., in different computer systems that are connected over a network.

Design information 815 may be specified using any of various appropriate computer languages, including hardware description languages such as, without limitation: VHDL, Verilog, SystemC, SystemVerilog, RHDL, M, MyHDL, etc. Design information 815 may be usable by semiconductor fabrication system 820 to fabricate at least a portion of integrated circuit 830. The format of design information 815 may be recognized by at least one semiconductor fabrication system 820. In some embodiments, design information 815 may also include one or more cell libraries which specify the synthesis, layout, or both of integrated circuit 830. In some embodiments, the design information is specified in whole or in part in the form of a netlist that specifies cell library elements and their connectivity. Design information 815, taken alone, may or may not include sufficient information for fabrication of a corresponding integrated circuit. For example, design information 815 may specify the circuit elements to be fabricated but not their physical layout. In this case, design information 815 may need to be combined with layout information to actually fabricate the specified circuitry.

Integrated circuit 830 may, in various embodiments, include one or more custom macrocells, such as memories, analog or mixed-signal circuits, and the like. In such cases, design information 815 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 820 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 820 may also be configured to perform various testing of fabricated circuits for correct operation.

In various embodiments, integrated circuit 830 is configured to operate according to a circuit design specified by design information 815, which may include performing any of the functionality described herein. For example, integrated circuit 830 may include any of various elements shown in FIGS. 1B, 2, 3, 4, and 7. Further, integrated circuit 830 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
   cache circuitry that includes multiple cache entry circuits, wherein a given cache entry circuit is configured to store a cache block;
   tag circuitry configured to maintain a tag value shared by multiple cache entry circuits, wherein the tag value is a portion of an address, wherein the portion is shared by cached entries and is maintained for comparison with incoming cache requests to determine hits and misses in the cache circuitry;
   cache control circuitry configured to, in response to a miss for a request for a first cache block, initiate a fetch request to a next level cache or memory;
   aggregation circuitry configured to:
      store, for the tag value, valid fetch information that indicates that:
         a first cache entry circuit that shares the tag value has initiated a valid fetch request that has not completed; and
         a second cache entry circuit that shares the tag value has initiated a valid fetch request that has not completed; and
      aggregate, based on the valid fetch information, fetch requests for the first and second cache entry circuits in response to a determination that requested cache blocks share the tag value, wherein the fetch requests are based on misses in the cache circuitry; and
   fetch circuitry configured to initiate a single multi-block fetch operation to the next level cache or memory that returns cache blocks for the aggregated fetch requests.

2. The apparatus of claim 1, wherein the cache blocks store respective page table entries, wherein the cache circuitry is included in translation circuitry that is configured to convert an input address in a first address space to an output address in a second address space based on a page table entry.

3. The apparatus of claim 1, wherein the cache circuitry is configured to maintain a validity field per cache entry circuit and wherein the cache circuitry is configured to use the tag circuitry and validity fields to determine whether requests hit or miss in the cache circuitry at cache block granularity.

4. The apparatus of claim 1, wherein the cache circuitry is configured to maintain a fetch pending field for a set of cache entry circuits that share the tag value, wherein the fetch pending field indicates whether a fetch is pending for any of the cache entry circuits that share the tag value.

5. The apparatus of claim 1, wherein the fetch circuitry is configured to receive a fetch response for the multi-block fetch operation and update the valid fetch information based on cache blocks indicated as fetched in the fetch response.

6. The apparatus of claim 1, further comprising:
arbitration circuitry configured to arbitrate among requests to use a fetch bus, wherein the aggregation circuitry is configured to aggregate fetch requests for cache entry circuits that share the tag value until a request with the tag value wins arbitration for the fetch bus.

7. The apparatus of claim 6, wherein the fetch bus has a width that is sufficient to fetch data in parallel for the multiple cache entry circuits that share the tag value.

8. The apparatus of claim 1, wherein cache circuitry is included in a graphics processor that further includes:
one or more shader cores; and
a memory management unit.

9. The apparatus of claim 1, wherein the valid fetch information further indicates that a third cache entry circuit that shares the tag value does not have a valid fetch request.

10. A non-transitory computer readable storage medium having stored thereon design information that specifies a design of at least a portion of a hardware integrated circuit in a format recognized by a semiconductor fabrication system that is configured to use the design information to produce the circuit according to the design, wherein the design information specifies that the circuit includes:
cache circuitry that includes multiple cache entry circuits, wherein a given cache entry circuit is configured to store a cache block;
tag circuitry configured to maintain a tag value shared by multiple cache entry circuits, wherein the tag value is a portion of an address, wherein the portion is shared by cached entries and is maintained for comparison with incoming cache requests to determine hits and misses in the cache circuitry;
cache control circuitry configured to, in response to a miss for a request for a first cache block, initiate a fetch request to a next level cache or memory;
aggregation circuitry configured to:
store, for the tag value, valid fetch information that indicates that:
a first cache entry circuit that shares the tag value has initiated a valid fetch request that has not completed; and
a second cache entry circuit that shares the tag value has initiated a valid fetch request that has not completed; and
aggregate, based on the valid fetch information, fetch requests for the first and second cache entry circuits in response to a determination that requested cache blocks share the tag value, wherein the fetch requests are based on misses in the cache circuitry; and
fetch circuitry configured to initiate a single multi-block fetch operation to the next level cache or memory that returns cache blocks for the aggregated fetch requests.

11. The non-transitory computer readable storage medium of claim 10, wherein the cache blocks store respective page table entries, wherein the cache circuitry is included in translation circuitry that is configured to convert an input address in a first address space to an output address in a second address space based on a page table entry.

12. The non-transitory computer readable storage medium of claim 10, wherein the cache circuitry is configured to maintain a validity field per cache entry circuit and wherein the cache circuitry is configured to use the tag circuitry and validity fields to determine whether requests hit or miss in the cache circuitry at cache block granularity.

13. The non-transitory computer readable storage medium of claim 12, wherein the cache circuitry is configured to maintain a fetch pending field for a set of cache entry circuits that share the tag value, wherein the fetch pending field indicates whether a fetch is pending for any of the cache entry circuits that share the tag value.

14. The non-transitory computer readable storage medium of claim 10, wherein the fetch circuitry is configured to receive a fetch response for the multi-block fetch operation and update the valid fetch information based on cache blocks indicated as fetched in the fetch response.

15. The non-transitory computer readable storage medium of claim 10, wherein the circuit further comprises:
arbitration circuitry configured to arbitrate among requests to use a fetch bus, wherein the aggregation circuitry is configured to aggregate fetch requests for cache blocks that share the tag value until a request with the tag value wins arbitration for the fetch bus, wherein the fetch bus has a width that is sufficient to fetch data in parallel for the multiple cache blocks that share the tag value.

16. The non-transitory computer readable storage medium of claim 10, wherein the valid fetch information further indicates that a third cache entry circuit that shares the tag value does not have a valid fetch request.

17. A method, comprising:
storing, by cache circuitry, multiple cache blocks using multiple different cache entry circuits;
maintaining, by tag circuitry, a tag value shared by multiple cache entry circuits, wherein the tag value is a portion of an address, wherein the portion is shared by cached entries and is maintained for comparison with incoming cache requests to determine hits and misses in the cache circuitry;
in response to a miss for a request for a first cache block, cache control circuitry initiating a fetch request to a next level cache or memory;
storing, by aggregation circuitry for the tag value, valid fetch information that indicates that:
a first cache entry circuit that shares the tag value has a initiated valid fetch request that has not completed; and
a second cache entry circuit that shares the tag value has initiated a valid fetch request that has not completed;
aggregating, by aggregation circuitry based on the valid fetch information, fetch requests for the first and second cache entry circuits in response to a determination that requested cache blocks share the tag value, wherein the fetch requests are based on misses in the cache circuitry; and
initiating, by fetch circuitry, a single multi-block fetch operation to the next level cache or memory that returns cache blocks for the aggregated fetch requests.

18. The method of claim 17, further comprising:
maintaining a fetch pending field for a set of cache entry circuits that share the tag value, wherein the fetch pending field indicates whether a fetch is pending for any of the cache entry circuits that share the tag value.

19. The method of claim 17, further comprising:
arbitrating among requests to use a fetch bus, wherein the aggregation circuitry aggregates fetch requests for cache entry circuits that share the tag value until a request with the tag value wins arbitration for the fetch bus.

20. The method of claim 17, wherein the valid fetch information further indicates that a third cache entry circuit that shares the tag value does not have a valid fetch request.

* * * * *